W. S. HARLEY.
SIDE CAR BODY AND METHOD OF PACKING THE SAME.
APPLICATION FILED SEPT. 13, 1918.

1,301,257.

Patented Apr. 22, 1919.
2 SHEETS—SHEET 1.

WITNESSES:

INVENTOR
William S. Harley
BY
Geo. S. Young
ATTORNEY

W. S. HARLEY.
SIDE CAR BODY AND METHOD OF PACKING THE SAME.
APPLICATION FILED SEPT. 13, 1918.
1,301,257.
Patented Apr. 22, 1919.
2 SHEETS—SHEET 2.
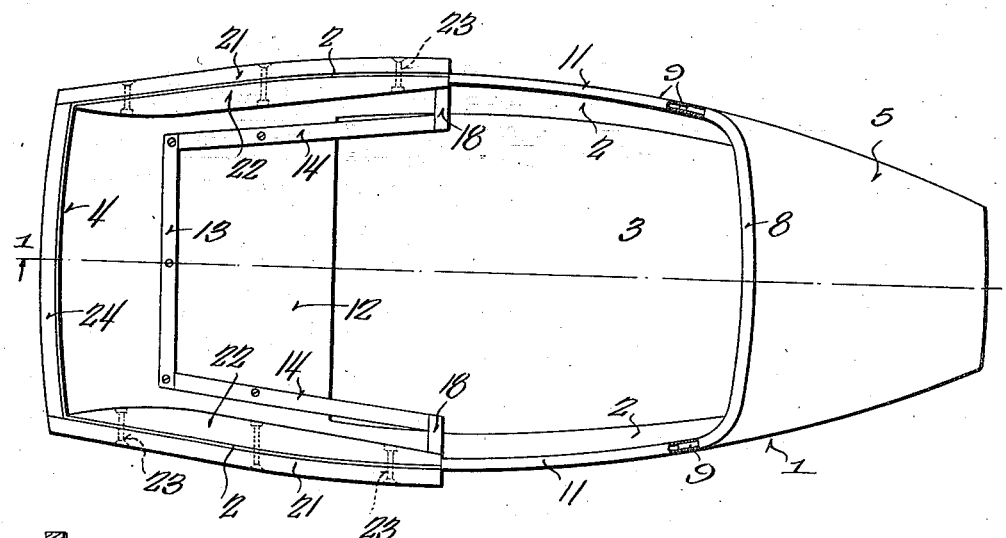
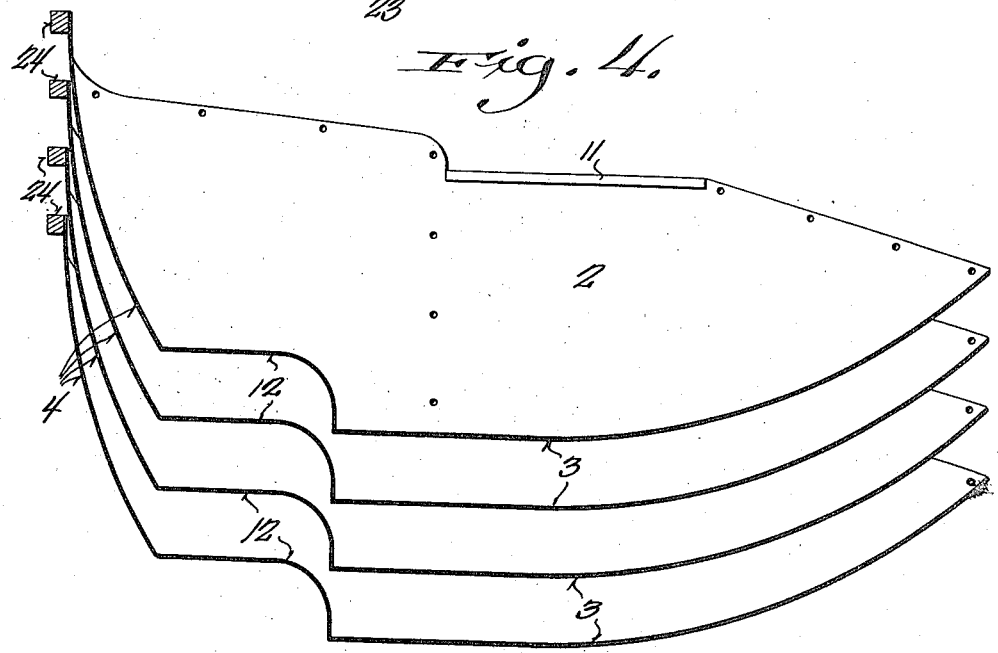
WITNESSES:
INVENTOR
William S. Harley
BY
ATTORNEY

UNITED STATES PATENT OFFICE.

WILLIAM S. HARLEY, OF MILWAUKEE, WISCONSIN, ASSIGNOR TO HARLEY-DAVIDSON MOTOR COMPANY, OF MILWAUKEE, WISCONSIN.

SIDE-CAR BODY AND METHOD OF PACKING THE SAME.

1,301,257.   Specification of Letters Patent.   Patented Apr. 22, 1919.

Application filed September 13, 1918. Serial No. 253,892.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Side-Car Bodies and Methods of Packing the Same; and I do hereby declare that the following is a full, clear, and exact description thereof.

My invention refers to improvements in motorcycle side cars and particularly to such a car having the majority of its parts readily detachable so that the bodies proper may be effectively packed into a relatively small space for transportation or storage.

Heretofore it has been practically impossible to ship a number of motorcycle side car bodies within a crate of reasonable size owing to their bulk. This consequently required a large amount of shipping space and naturally the expense of transportation was considerable. The object of the present invention therefore is to provide a side car body which can be readily nested in other bodies of similar construction and is also adapted to have such bodies nested in itself. By such an arrangement a plurality of bodies may be superimposed and disposed one within the other so that the total number will require only a small fraction of the space which a like number of side cars of ordinary construction will occupy.

A secondary object of the invention is to provide a side car from the body of which the majority of parts, such as the upholstery, the cowl, etc., may be readily detached.

An additional object is to provide a motorcycle side car having its cushions and other upholstery readily detachable or attachable.

A still further object is to provide an improved means for detachably connecting the cowl to the body of a side car.

With these and other objects and advantages in view the invention resides in the novel features of construction, combination and arrangement of parts which will be hereinafter more particularly described and claimed and shown in the drawings in which:

Fig. 3 is a plan view of a side car body before the upholstery has been applied, and Fig. 4 is a vertical longitudinal sectional view through a plurality of nested side car bodies which are ready to be packed or crated for shipment.

Figure 1:
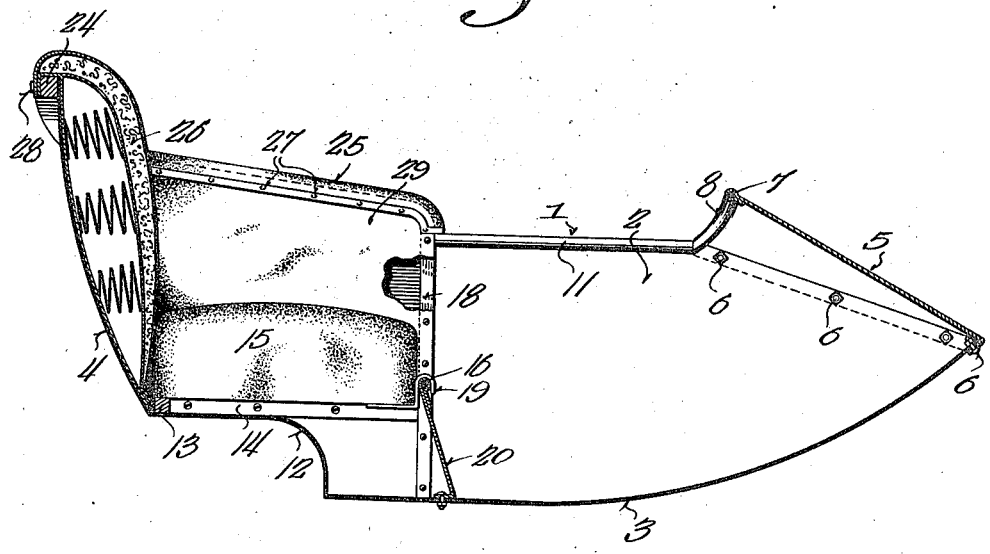
Figure 1 represents a vertical longitudinal sectional view taken upon the plane of the line 1—1 of Fig. 3.

As is usual in devices of this character the side car is formed of sheet metal wherever practical, and in the present invention the sheet metal body proper of a side car is designated by the numeral 1. It will be seen from the drawings that such body includes side walls 2, a floor 3, and a back wall 4, these parts being assembled and secured together in any desired manner, but preferably rigidly as by welding or brazing.

Figure 2:
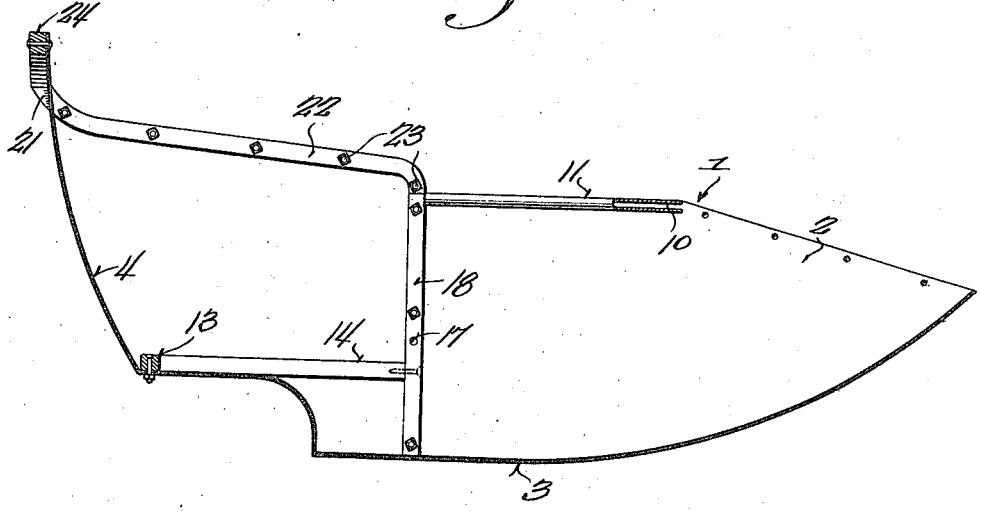
Fig. 2 is a similar view of the side car body having its upholstery and cowl removed.

A body thus formed has its top entirely open as clearly indicated in Figs. 2 and 4. When complete, however, the forward end of the body is finished off by means of a cowl 5, which not only gives the side car a pleasing appearance, but forms a shield as is obvious.

In the present instance the cowl is detachably connected to the body 1, and in carrying out this connection the outer edge portions of the sheet of material forming the cowl are bent laterally and are designed to overlappingly engage the upper edges of the side walls 2 and the front edge of the floor 3 which slopes upwardly as is customary. These laterally bent portions of the cowl form in effect attaching flanges through which bolts 6 are passed and engaged with the body.

The inner or free edge of the cowl is rolled about a reinforcing wire 7 as indicated at 8, and the opposite ends of this wire are extended rearwardly from the side of said cowl to form pins 9 for engagement in sockets 10. These sockets are constructed by rolling the upper edge portions of the side walls 2 mid-way their ends as will be seen at 11.

The extreme rear end of the floor 3 is pressed upwardly as at 12, and on this raised portion adjacent its attachment to the side and rear walls 2 and 4 respectively are wooden supporting strips 13 and 14 upon which a seat cushion 15 rests when in position. The strips 14 extend longitudinally of the body 1 and project forwardly of the front edge of the raised portion 12 in order to effectively support the front end of the seat cushion which also extends from said raised portion.

The front edge of said seat cushion, however, is directly supported by means of a transversely extending rod 16 disposed between the side walls 2, the opposite ends of said rod being seated in sockets 17 bored in vertical wooden side brace strips 18, the latter being secured to the side walls 2. Hooked fingers 19 carried by the seat cushion are disposed over this rod. A rod supporting plate 20 is rolled about said rod 16 and has its lower edge secured to the floor 3.

Said brace strips 18 extend from the floor 3 to the upper edge of the walls 2, and said edges of the walls between the strips 18 and the rear wall 4 have detachable wooden side arms 21 and 22, which are secured together and to the walls 2 by bolts or the like 23. From Fig. 3 it will be noted that the arms 21 are in engagement with the external surfaces of the walls 2, while the arms 22 are on the inner side thereof, thus effectively reinforcing the sheet metal of which such walls are formed. The upper edge of the rear wall 4 is also reinforced by a wood back strip 24.

The strips 13, 14, 18 and 24 and the side arms 21 and 22 are technically termed tacking strips inasmuch as the upholstery is normally tacked thereto. In the present invention, however, I preferably provide the upholstery with means for detachably connecting the same, as by snap fasteners, to said strips. For instance the arm cushions 25 which cover the side arms 21 and 22 and the back cushion 26 are formed as complete units adapted to fit any body constructed in accordance with the present invention. The inner and outer edges of the arm cushions 25 have rows of fasteners 27 which coöperate with other fasteners on the side arms 21 and 22; the upper edge of the back cushion 26 has a row of fasteners 28 for engagement with fasteners on the back strip 24. Said back cushion depends within the body 1 and rests against the back wall 4, its lower edge being free and held between said wall 4 and the rear edge of the seat cushion 15 when the latter is in position. Side coverings 29 also cut to size and capable of fitting any car, and provided with attaching means are used for finishing the rear end of the side car body between the brace strips 18 and the rear wall 4.

When the side cars are shipped from the factory they are packed in nested relation as shown in Fig. 4, and when so arranged the bodies have only the back strips 24 secured thereto, the other detachable parts such as the cowl, the upholstery, the tacking strips, and the seat support being disposed in the bottoms of the several bodies or packed in seperate crates as may be desired. When the shipment of bodies reaches its destination it is an easy matter for even an unskilled or inexperienced mechanic to assemble the side cars owing to the ease with which the several detachable parts are secured in position. In other words each body has a cowl 5 disposed over its front end by first inserting the pins 9 in the sockets 10 and thereafter bolting the attaching flanges to the walls and bottom. The tacking strips are next bolted in position, after which the upholstery units are snapped on. As all the parts have been previously cut and finished it is impossible not to properly assemble the side cars. In addition to the ease of assembling the side cars, attention is also directed to the fact that a great amount of shipping space is saved because of the improved method of packing.

I claim:—

1. A side car of the class described comprising a body having an entirely open top and having its side walls inclined outwardly whereby said body may be nested in a second body of like construction and may have a third similar body nested therein whereby a plurality of side car bodies may be packed to occupy a relatively small space, and a detachable cowl for the forward end portion of the body having a front flange adapted to engage against the outer face of the front of the body and having side flanges for lapping engagement with the upper edge portions of the sides of the body, said flanges being inclined together in both forward and downward directions in conformity with similar shape of the body side walls whereby to procure a snug, interlocking fit therewith.

2. A side car of the class described comprising a body having an entirely open top, a detachable cowl for the forward end of the body, said cowl having a pin projecting rearwardly from each side edge, and a socket formed on each side of the body to receive one of said pins.

3. A side car of the class described comprising a body having an entirely open top, a detachable cowl for the forward end of the body, said cowl having a pin projecting rearwardly from each side edge, and a socket formed on each side of the body to receive one of said pins, said sockets being formed by rolling the upper edge portions of the side walls of said body.

4. A side car of the class described comprising a body having an entirely open top, a detachable cowl for the forward end of the body, a reinforcing wire secured to the inner edge of said cowl, the opposite ends of said wire projecting rearwardly, and a socket formed on each side of the body, said sockets receiving the rearwardly projecting ends of said reinforcing wire.

In testimony that I claim the foregoing I have hereunto set my hand at Milwaukee, in the county of Milwaukee, and State of Wisconsin.

WILLIAM S. HARLEY.